US010813360B2

(12) United States Patent
Ugalde Martinez et al.

(10) Patent No.: US 10,813,360 B2
(45) Date of Patent: Oct. 27, 2020

(54) PHYTOSANITARY COMPOSITION COMPRISING ESSENTIAL OILS THAT POTENTIATE ANTIFUNGAL ACTIVITY

(71) Applicant: BIOFUNGITEK, S. L., Derio (Bizkaia) (ES)

(72) Inventors: Unai Ona Ugalde Martinez, Hondarribia (ES); Ana Belen Rodriguez Urra, Donostia-San Sebastian (ES); Ainara Ubegun Lizaso, Lasarte-Oria (ES)

(73) Assignee: BIOFUNGITEK, S.L., Derio (Bizkaia) (ES)

( * ) Notice: Subject to any disclaimer, the term of this patent is extended or adjusted under 35 U.S.C. 154(b) by 0 days.

(21) Appl. No.: 16/231,734

(22) Filed: Dec. 24, 2018

(65) Prior Publication Data

US 2019/0133139 A1  May 9, 2019

Related U.S. Application Data

(60) Continuation-in-part of application No. 15/890,484, filed on Feb. 7, 2018, which is a division of application No. 13/982,181, filed as application No. PCT/ES2012/070005 on Jan. 5, 2012, now abandoned.

(30) Foreign Application Priority Data

Mar. 18, 2011 (ES) .................................. 201130390

(51) Int. Cl.
| | |
|---|---|
| *A01N 65/22* | (2009.01) |
| *A01N 59/04* | (2006.01) |
| *A01N 59/00* | (2006.01) |
| *A01N 59/20* | (2006.01) |
| *C05G 3/60* | (2020.01) |
| *A01N 31/08* | (2006.01) |
| *A01N 65/08* | (2009.01) |
| *A01N 65/24* | (2009.01) |
| *A01N 65/26* | (2009.01) |
| *A01N 65/28* | (2009.01) |
| *A01N 65/36* | (2009.01) |
| *A01N 65/00* | (2009.01) |

(52) U.S. Cl.
CPC ............ *A01N 65/22* (2013.01); *A01N 31/08* (2013.01); *A01N 59/00* (2013.01); *A01N 59/04* (2013.01); *A01N 59/20* (2013.01); *A01N 65/00* (2013.01); *A01N 65/08* (2013.01); *A01N 65/24* (2013.01); *A01N 65/26* (2013.01); *A01N 65/28* (2013.01); *A01N 65/36* (2013.01); *C05G 3/60* (2020.02)

(58) Field of Classification Search
None
See application file for complete search history.

(56) References Cited

U.S. PATENT DOCUMENTS

| | | | |
|---|---|---|---|
| 4,617,419 | A | 10/1986 | Wiener et al. |
| 5,346,704 | A | 9/1994 | Lajoie |
| 6,291,401 | B1 | 9/2001 | Dufau et al. |
| 6,849,276 | B1 | 2/2005 | Dufau et al. |
| 6,849,576 | B2 | 2/2005 | Suzuki et al. |
| 7,053,071 | B2 | 5/2006 | Dawson et al. |
| 2006/0008486 | A1 | 1/2006 | Lewis |
| 2010/0099777 | A1 | 4/2010 | Devisetty et al. |
| 2018/0168169 | A1 | 6/2018 | Ugalde Martinez et al. |

FOREIGN PATENT DOCUMENTS

| | | |
|---|---|---|
| EP | 517569 A1 | 12/1992 |
| EP | 2047749 A2 | 4/2009 |
| EP | 1845786 B1 | 3/2010 |
| EP | 2684456 A1 | 1/2014 |
| EP | 2946673 A1 | 11/2015 |
| ES | 2206887 T3 | 5/2004 |
| ES | 2344416 T3 | 8/2010 |
| FR | 2828064 A1 | 2/2003 |
| FR | 2917947 A1 | 1/2009 |
| WO | 0024259 A1 | 5/2000 |
| WO | 2005058364 A2 | 6/2005 |
| WO | 2007090714 A1 | 8/2007 |
| WO | 2011119049 A1 | 9/2011 |

OTHER PUBLICATIONS

**European Office Action dated Feb. 22, 2016 pertaining to European Application No. 12761378.4.
**Indian Examination Report dated Jul. 13, 2018 pertaining to Indian Application No. 6709/DELNP/2013.
** "For Outdoor Use Only", Dec. 31, 2004, XP055250457, retrieved from the Internet: URL:http://s3-us-west-1.amazonaws.com/www.agrian.com/pdfs/Rose_Pharm_(1-28-08)_Label.pdf [retrieved on Feb. 16, 2016].
**Kaamil-al-Sena'ah, Part II (10th century AD), Central Council for Research in Unani Medicine, 61-65 Institutional Area, Janak Puri, New Delhi-58, 2005 AD.

(Continued)

*Primary Examiner* — Susan Hoffman
(74) *Attorney, Agent, or Firm* — Dinsmore & Shohl LLP

(57) ABSTRACT

The present invention relates to phytosanitary compositions with fungicidal properties that comprise a mixture of essential oils obtained from plants and agents with known fungicidal properties, such as alkali metal or ammonium bicarbonates, and compounds based on copper or the salts thereof, for use, principally, in contact-protection against fungal infections in cultivated plants and post-harvest, and also in other antifungal applications. In said compositions, the effect of the agents that have known fungicidal properties is potentiated synergistically by the aforementioned essential oils. The present invention also relates to the use of said essential oils as potentiators for agents with known fungicidal properties.

7 Claims, No Drawings

(56) References Cited

OTHER PUBLICATIONS

\*\*Al-Qaanoon-fil-Tibb, vol. V (11th century AD), Publication Department, Jamia Hamdard, New Delhi-62, 1996 AD.
\*\*Kitaab-al-Haawi-fil-Tibb, vol. IX (9th century AD), Dayerah-al-Ma'aarif Usmania, Hyderabad, (First Edition) 1960 AD.
European Search Report dated Jul. 31, 2014 for European Application No. 12761378.4.
Chinese Office Action dated Jun. 23, 2014 for Chinese Application No. 2012800106414.
Li et al., Food Science and Technology, 2007, No. 1, pp. 185-188.
International Search Report dated May 7, 2012 in corresponding Application No. PCT/ES2012/070005 filed Jan. 5, 2012.
Methanol Systemic Agent https://www.cdc.gov/niosh/ershdb/emergencyresonsecard_29750029.htm Accessed: Nov. 3, 2017.
"Making "K" Pay in your Vineyard: Dripping Potassium Carbonate into the System", Joe Traynor Beesource Beekeeping (Feb. 2011) Accessed from: https://web.archive.org/web/20110203080649/http://beesource.com/point-of-view/joe-traynor/making-k-pay-in-your-vineyard-dripping-potassium-carbonate-into-the-system.
"Nematicidal Activity of Cassia and Cinnamon Oil Compounds and Related Compounds toward Bursaphelenchus xylophilus" (Nematoda: Parasitaphelenchidae) Kong et al. Journal of Nematology (2007) vol. 39, No. 1, pp. 31-36.
"Characterization of antioxidant and antimicrobial compounds of cinnamon and ginger essential oils" El-Baroty et al. African Journal of Biochemistry Research (2010), vol. 4, No. 6, pp. 167-174.
"Bioactivity of two major constituents isolated from the essential oil of *Artemisia judaica* L" Abdelgaleil et al. Bioresource Technology (2008), vol. 99, pp. 5947-5950.
"Sodium" http://www.chemistryexplained.com/elements/P-T/Sodium.html Accessed: Dec. 2, 2016.
"Potassium Carbonate" Evonik Industries AG; GPS Safety Summary K2CO3 Mar. 2014; Version 2.
"A comparison of chemical, antioxidant and antimicrobial studies of cinnamon leaf and bark volatile oils, oleoresins and their constituents" Singh et al. Food and Chemical Toxicology (2007), vol. 45, pp. 1650-1661.
Chemical composition and antifungal activity of rosemary (*Rosmarinus officinalis* L.) oil from Turkey Ozcan et al. International Journal of Food Sciences and Nutrition (2008), vol. 59, No. 7-8, pp. 691-698.
"Natural products in crop protection" Dayan et al. Bioorganic & Medicinal Chemistry (2009), vol. 17, pp. 4022-4034.
"Copper as a Biocidal Tool" Borkow et al. current Medicinal Chemistry (2005), vol. 12, pp. 2163-2175.
"The Phenolic Hydroxyl Group of Carvacrol Is Essential for Action against the Food-Borne Pathogen *Bacillus cereus*" Ultee et al. Applied and Environmental Microbiology (2002), vol. 68, No. 4, pp. 1561-1568.
Election/Restriction dated Apr. 13, 2016 for U.S. Appl. No. 13/982,181, filed Jul. 26, 2013.
Non-Final Office Action dated Jun. 21, 2016 for U.S. Appl. No. 13/982,181, filed Jul. 26, 2013.
Final Office Action dated Dec. 7, 2016 for U.S. Appl. No. 13/982,181, filed Jul. 26, 2013.
Non-Final Office Action dated Feb. 16, 2017 for U.S. Appl. No. 13/982,181, filed Jul. 26, 2013.
Final Office Action dated Nov. 8, 2017 for U.S. Appl. No. 13/982,181, filed Jul. 26, 2013.
European Search Report for European Application No. 18157571.3 dated Apr. 17, 2018.
Ahmad, A. et al., Fungicidal activity of thymol and carvacrol by disrupting ergosterol biosynthesis and membrane integrity against Candida, European Journal of Clinical Microbiology & Infectious Diseases, 30(1): 41-50, 2011.
Arfa A., et al., Antimicrobial activity of carvacrol related to its chemical structure, Letters in Applied Microbiology, 43 (2): 149-154, Aug. 2006.
Nigro, F. et al., Control of table grape storage rots by pre-harvest applications of salts, Postharvest Biology and Technology, 42: 142-149, 2006.
Palmer, C. et al., Use of Biocarbonates to Inhibit in vitro Colony Growth of Botrytis cinerea, Plant Disease, 81(12): 1432-1438, Dec. 1997.

PHYTOSANITARY COMPOSITION COMPRISING ESSENTIAL OILS THAT POTENTIATE ANTIFUNGAL ACTIVITY

CROSS-REFERENCE TO RELATED APPLICATIONS

This application is a continuation in part of U.S. patent application Ser. No. 15/890,484 filed Feb. 7, 2018, which is a divisional application of U.S. patent application Ser. No. 13/982,181 filed Jul. 26, 2013, now abandoned, which is a U.S. National Stage Application of PCT/ES2012/070005 filed Jan. 5, 2012, which claims benefit to Spanish Patent Application No. 201130390 filed Mar. 18, 2011, the contents of these applications being incorporated herein by reference in their entirety.

DESCRIPTION

This invention relates to phytosanitary compositions having fungicidal properties comprising a mixture of essential oils obtained from plants and agents having known fungicidal properties such as alkali metal or ammonium bicarbonates, or compounds based on copper or copper salts, for use mainly in contact protection against fungicidal infections in cultivated plants and post-harvesting, and in other antifungal applications. In these compositions the effect of the agents having known fungicidal properties is synergistically potentiated by the essential oils mentioned. This invention also relates to use of these essential oils as potentiators for agents having known fungicidal properties.

Essential oils are complex mixtures of natural molecules which are fundamentally obtained from plants. They are secondary metabolites which can normally be obtained by extraction with organic solvents and subsequent concentration, or by physical treatments with steam followed by separation of the water-insoluble phase. Generally they are volatile liquids soluble in organic solvents and have a density lower than that of water.

In nature they can be synthesised in different plant organs such as seeds, leaves, flowers, epidermal cells and fruits, among others, and they play an important part in protecting plants against bacterial, viral or fungal infections.

The fungicidal and bactericidal action of many plant essential oils is known, have arrived in some case to be marketed commercially. Among these are jojoba oil (*Simmondsia californica*), rosemary oil (*Rosemarinus officianalis*), thyme oil (*T. vulgaris*), the clarified hydrophobic extract of neem oil (*A. indica*), cottonseed oil (*Gossypium hirsutum*) with garlic extract (Dayan, F. E. et al. "Natural products in crop protection". Bioorg. and Med. Chem. 17 (2009), 4022-4034).

The chemical composition of essential oils differs not only in the quantity but also in the quality and the stereochemical type of the molecules in the extracted substances. The extraction product may vary according to climate, the composition of the soil, the organ of the plant used for extraction, and the age and stage of growth of the plant. It also depends on the extraction process used.

Furthermore, the use of inorganic salts such as the bicarbonates of alkali metals, mainly lithium, sodium or potassium, and ammonium bicarbonate as fungicidal agents is also known from the prior art (U.S. Pat. No. 5,346,704). The use of these inorganic salts, in particular those containing the bicarbonate anion, does not give rise to any risks to human health or to the environment.

The fungicidal nature of products based on copper or its salts are also known, and these have been extensively used in agriculture. In the year 1761 it was discovered that these solutions inhibit the growth of fungi on seed. Since then copper-based fungicides have been used in well-known formulae such as Bordeaux mixture (Copper as a Biocidal Tool. Gadi Borkow and Jeffrey Gavia. Current Medicinal Chemistry, volume 12: 2163-2175).

Because of their natural origin plant essential oils are very attractive for application in agriculture in order to obtain healthy and harmless products, as this is a requirement which has been made increasingly strictly, by both consumers and regulatory authorities.

There is therefore a need to find new phytosanitary compositions having antifungal properties to protect crops, including during post-harvesting, which have a minimum of secondary toxic effects and which are harmless to human beings and the environment.

The present authors have surprisingly found that some essential oils obtained from plants when mixed with other products having known antifungal properties potentiate the antifungal properties of these compounds, such as inorganic salts, for example alkali metal or ammonium bicarbonates, and antifungal products based on copper or its salts.

Thus one object of this invention is to provide a phytosanitary composition having antifungal properties comprising: 1) one or more essential oils obtained from plants and 2) one or more agents having known fungicidal properties. This composition synergistically improves the antifungal properties of the agents having known antifungal activity, has a minimum of secondary toxic effects and is harmless to human beings and the environment.

The composition according to this invention may be applied in agriculture to protect crops from the stage of germination to harvesting, and during the storage and transport of these crops, seeds, flowers or grains. Likewise, another possible application is in the elimination of fungi which attack painted surfaces and to protect carpets and fabrics in the home and in any other application against fungal attack through contact.

Among the essential oils which may be used in the phytosanitary composition according to this invention are thyme oil (*Thymus vulgaris*), oregano oil (*Origanum vulgaris*), clove oil (*Syzygium aromaticum*), nutmeg oil (*Myristica fragrans*), cinnamon oil (*Cinnamomum zeylanicum*), laurel oil (*Laurus nobilis*), orange oil (*Citrus x sinensis*), mint oil (*Mentha x piperita*), valerian oil (*Valeriana officinalis*), citronella oil (*Cymbopogon nardos*), lavender oil (*Lavanda angustifolia*), jojoba oil (*Simmondsia californica*), rosemary oil (*Rosemarinus officianalis*), neem oil (*Azadirachta indica*), cottonseed oil (*Gossypium hirsutum*) or mixtures thereof.

Without being bound to any theory in particular, it is possible that the property of the essential oils obtained from plants in potentiating antifungal activity is due to some of the compounds having known activity present in these essential oils. Thus in one embodiment of this invention the phytosanitary composition may comprise a mixture of active compounds isolated from the essential oils according to this invention, such as phenolic monoterpenoids such as carvacrol and thymol, allylbenzenes such as eugenol, monosubstituted phenols such as trans-cinamaldehyde, cyclic monoterpenes such as limonene, bicyclic monoterpenes such as camphene and linear terpenes such as nerol, any of their families and mixtures thereof, and agents having known fungicidal properties. The mechanism of action of the essential oils is a multiple one due to the complex mixture of different active ingredients which they contain. However the nature of the action of the major components in some of these oils has been described. The best described in the literature is the nature of the action of carvacrol on the growth of bacterial and yeast cells (The phenolic hydroxyl group of carvacrol is essential for action against the foodborne pathogen *Bacillus cereus*. A. Ultee et al., Applied and Environmental Microbiology, April 2002, 1561-1568). According to these studies carvacrol is capable of crossing the cell membrane when it is protonated (in acid medium) and on reaching the cytoplasm releases a proton, resulting in acidification of the cell. This manner of action does not rule out other possible modes of action such as increase in the permeability of the membrane or specific inhibiting effects on catalytic processes.

Among the agents having known fungicidal properties which may be used in the composition according to the invention there are the carbonates or bicarbonates of alkali metals, preferably of lithium, sodium or potassium, ammonium carbonate or bicarbonate and fungicidal agents based on copper or its salts or mixtures thereof. More preferably the agent having known fungicidal properties is potassium bicarbonate.

The quantity of essential oils present in the composition according to this invention lies within the range from 0.01% to 99.99% by weight of the total composition. Also the quantity of the agent having known fungicidal properties in the composition according to this invention may vary between 99.99% and 0.01% by weight of the total composition.

The composition according to this invention may be prepared by mixing the essential oil or oils and the agent having fungicidal properties through any method of mixing known in the art. In general essential oils are liquid at ambient temperature, as a result of which the composition will generally be in the form of a liquid. However, the composition may also be in liquid or solid form, such as a suspension, dispersion, emulsion, spray, microencapsulate or any other type of mixture which remains stable over time or may be incorporated in polymers, waxes or any other similar supports.

Furthermore the phytosanitary composition according to this invention may be used as such, or may be used to formulate a phytosanitary product together with different additives used in the art which offer different properties, such as surfactants, polymers, alkanising agents, pH-control agents, among many other additives used in the formulation of products used in the agricultural industry.

In embodiments, the phytosanitary composition may include carvacrol at a concentration between 0.1 ppm and 530 ppm and potassium carbonate at a concentration between 3.5 mM and 25 mM. For example, the carvacrol may be present in a concentration between 22 ppm and 310 ppm. The potassium carbonate may be present in a concentration between 10 mM and 25 mM, for example.

The phytosanitary composition according to this invention falls within the group of contact phytosanitary agents, that is the form of the protection against fungal diseases is through contact, given that the composition remains on the surface of different parts of the plant, protecting it externally against the external attack of fungi.

Being a liquid, a powder or a microencapsulate, the phytosanitary composition according to this invention can be applied by any method of application known in the art, such as spraying.

The fungicidal composition according to this invention may further comprise a fertiliser, which may be selected from the group comprising compounds containing nitrogen and/or phosphorus such as urea, melamine, hexamine, dicyanodiamide, ameline, cyanuric acid, melamine nitrate, triethyl phosphite and the like or mixtures thereof.

The composition according to this invention may also comprise any compound or product having chemical and/or biological activity used in agriculture, such as herbicides, insecticides, plant growth regulators and the like, or mixtures thereof.

This invention is described below in greater detail with reference to various examples. However, these examples are not intended to restrict the technical scope of this invention.

EXAMPLES

Example 1 (Comparative). Inhibition of Growth of the Fungus *Botrytis cinerea* by KHCO$_3$ Alone The fungus *Botrytis cinerea* was cultured in PDB (potato dextrose broth) medium with different concentrations of KHCO$_3$ and the % inhibition representing the extent to which growth was impeded in comparison with a control which did not have the compound under test, in this case KHCO$_3$, was determined. The % inhibition was calculated in the following way:

$$\% \text{ inhibition} = [(OD_{control} - OD_x)/OD_{control}] \times 100$$

where $OD_{control}$ is the optical density of the control culture (without test compound) and $OD_x$ is the optical density of the culture with the test substance. The optical density of the liquid culture was measured 24 hours after the start of culturing.

The following results were obtained (Table I):

TABLE I

| | Inhibition of the growth of *B. cinerea* by KHCO$_3$ | | | | | |
|---|---|---|---|---|---|---|
| KHCO$_3$ concentration (mM) | 0 | 10 | 15 | 20 | 25 | 30 |
| Inhibition (%) ± SD | 0 | 34.2 ± 6.7 | 37.0 ± 11.3 | 38.8 ± 6.8 | 39.7 ± 0.7 | 46.9 ± 2.7 |

As will be seen from the table above, with a KHCO$_3$ concentration between 10 and 25 mM similar results were obtained as regards inhibition of the *B. Cinerea* culture. However greater inhibition was obtained at 30 mM.

Example 2. (Comparative). Inhibition of Growth of the Fungus *Botrytis cinerea* by Carvacrol Alone The fungus *B. cinerea* was cultured in a similar way to Example 1 with the difference that different concentrations of carvacrol, the compound isolated from the essential oil of oregano, were used in the medium. The 24 hour optical density of the culture was measured and the results are shown in Table II.

TABLE II

| Inhibition of the growth of *B. cinerea* by Carvacrol | | | | | | | |
|---|---|---|---|---|---|---|---|
| Carvacrol concentration (ppm) | 0.1 | 0.31 | 1 | 3.1 | 10 | 31 | 100 |
| Inhibition (%) ± SD | 0 | 10.5 ± 7.7 | 13.7 ± 4.1 | 22.4 ± 3.4 | 21.3 ± 5.0 | 51.4 ± 5.5 | 74.4 ± 1.1 |

Example 3. Inhibition of Growth of the Fungus *Botrytis cinerea* by the Composition According to this Invention (Carvacrol+$KHCO_3$)

The fungus *B. cinerea* was cultured in a similar way to Example 1 with the difference that different concentrations of carvacrol were used in the medium and that a constant concentration of $KHCO_3$ (30 mM) was used for all the cultures. The optical density of the culture was measured at 24 hour and the results are shown in Table III.

TABLE III

| Inhibition of the growth of *B. cinerea* by the composition according to this invention (Carvacrol + $KHCO_3$) | | | | | | | |
|---|---|---|---|---|---|---|---|
| $KHCO_3$ concentration (mM) | 30 | 30 | 30 | 30 | 30 | 30 | 30 |
| Carvacrol concentration (ppm) | 0.1 | 0.31 | 1 | 3.1 | 10 | 31 | 100 |
| Inhibition (%) ± SD | 86.1 ± 2.2 | 84.2 ± 3.6 | 48.9 ± 3.0 | 52.7 ± 2.6 | 82.5 ± 3.7 | 86.5 ± 1.3 | 91.1 ± 1.1 |

As will be seen, a carvacrol concentration as low as 0.1 ppm, whose inhibiting effect alone is zero (see Example 2) effectively doubles the inhibiting capacity of the $KHCO_3$, achieving levels of inhibition which are not even obtained with $KHCO_3$ concentrations that are toxic to plants.

Example 4. Inhibiting Effect of Copper Oxychloride Alone on the Fungus *Alternaria alternata*

*Alternaria alternata* was cultured in a similar way to Example 1 with the difference that different concentrations of copper oxychloride, a copper-based fungicide extensively used in agriculture, were used in the medium. The 24 hour optical density of the culture was measured and the results are shown in Table IV.

TABLE IV

| Inhibition of *A. alternata* by copper oxychloride | | | | | | | |
|---|---|---|---|---|---|---|---|
| Copper oxychloride concentration (ppm) | 0.1 | 0.5 | 1 | 5 | 10 | 15 | 20 |
| Inhibition (%) ± SD | 3.1 ± 6.4 | 0.0 ± 6.7 | 9.9 ± 0.9 | 10.0 ± 8.4 | 23.1 ± 4.7 | 37.4 ± 3.6 | 61.3 ± 6.7 |

Example 5. Inhibition of the Fungus *Alternaria alternata* by Carvacrol Alone

*Alternaria alternata* was cultured in a similar way to Example 2. The 24 hour optical density of the culture was measured and the results are shown in Table V.

TABLE V

Inhibition of *A. alternata* by Carvacrol.

| Carvacrol concentration (ppm) | 10 | 31 | 100 | 310 | 1000 |
|---|---|---|---|---|---|
| Inhibition (% ± SD) | 17.7 ± 11 | 27.2 ± 14 | 74.6 ± 8 | 97.2 ± 7 | 93.0 ± 6.0 |

Example 6. Inhibition of the Fungus *Alternaria alternata* by the Composition According to this Invention (Carvacrol+Copper Oxychloride)

The fungus *A. alternata* was cultured in a similar way to Example 4 with the difference that different concentrations of carvacrol were used in the medium and that a constant concentration of copper oxychloride (5 ppm) was used throughout. The 24 hour optical density of the culture was measured and the results are shown in Table VI.

TABLE VI

Inhibition of *A. alternata* by the composition according to this invention (Carvacrol + copper oxychloride)

| Copper oxychloride concentration (ppm) | 5 | 5 | 5 | 5 | 5 |
|---|---|---|---|---|---|
| Carvacrol concentration (ppm) | 1 | 3.1 | 10 | 31 | 100 |
| Inhibition (%) ± SD | 1.4 ± 13 | 26.0 ± 12 | 34.7 ± 14 | 53.2 ± 12 | 85.7 ± 3.6 |

As will be seen, a carvacrol concentration of 35 ppm and 5 ppm of copper oxychloride inhibit the growth of *A. alternata* by more than 50%, while carvacrol alone in that concentration provides 27% inhibition and copper oxychloride only 10%.

Example 7. Inhibition of the Fungus *Penicillium digitatum* by $KHCO_3$ Alone

The fungus *Penicillium digitatum* was cultured in a similar way to Example 1. The 24 hour optical density of the culture was measured and the results are shown in Table VII.

TABLE VII

Inhibition of *P. digitatum* by $KHCO_3$.

| $KHCO_3$ concentration (mM) | 10 | 20 | 30 | 40 | 50 |
|---|---|---|---|---|---|
| Inhibition (% ± SD) | 19.4 ± 2.9 | 19.1 ± 10 | 19.6 ± 8.9 | 19.8 ± 2.2 | 21.9 ± 6.6 |

As will be seen, the same degree of inhibition is obtained for different $KHCO_3$ concentrations.

Example 8. Inhibition of the Fungus *Penicillium digitatum* by Thymol Alone

The fungus *P. digitatum* was cultured in a similar way to Example 1 with the difference that different concentrations of thymol, a compound isolated from thyme oil, were used in the medium. The 24 hour optical density of the culture was measured and the results are shown in Table VIII.

TABLE VIII

| | | | | | | | |
|---|---|---|---|---|---|---|---|
| Inhibition of *P. digitatum* by Thymol alone | | | | | | | |
| Thymol concentration (ppm) | 0.31 | 1 | 3.1 | 10 | 31 | 100 | 310 |
| Inhibition (% ± SD) | 28.2 ± 3.9 | 24.2 ± 6.0 | 36.3 ± 2.3 | 36.2 ± 2.0 | 50.7 ± 2.0 | 78.3 ± 2.2 | 95.6 ± 0.5 |

Example 9. Inhibition of the Fungus *Penicillium digitatum* by the Composition According to this Invention ($KHCO_3$+Thymol)

The fungus *P. digitatum* was cultured in a similar way to Example 7 with the difference that different concentrations of thymol were used in the medium and that a constant concentration of $KHCO_3$ (30 mM) was used throughout. The 24 hour optical density of the culture was measured and the results are shown in Table IX.

TABLE IX

| | | | | | | |
|---|---|---|---|---|---|---|
| Inhibition of *P. digitatum* by the composition according to this invention ($KHCO_3$ + Thymol) | | | | | | |
| $KHCO_3$ concentration (mM) | 30 | 30 | 30 | 30 | 30 | 30 |
| Thymol concentration (ppm) | 0.31 | 1 | 3.1 | 10 | 31 | 100 |
| Inhibition (%) ± SD | 58.0 ± 2.1 | 62.9 ± 8.4 | 47.1 ± 3.7 | 56.4 ± 3.7 | 75.5 ± 1.9 | 92.6 ± 1.6 |

It will be seen how the results are improved by adding thymol to $KHCO_3$. With 31 ppm of thymol only 50% inhibition is achieved, and with 30 mM of $KHCO_3$ 20% inhibition is achieved. However when the two compounds are combined inhibition of growth of the fungus *P. digitatum* is increased up to some 75%.

The invention claimed is:

1. A phytosanitary composition having antifungal activity comprising: (1) an oregano (*Origanum vulgare*) essential oil obtained from plants comprising its active compound carvacrol which is present at a concentration between 0.1 and 530 ppm in the phytosanitary composition; and (2) potassium carbonate at a concentration between 3.5 and 25 mM.

2. A phytosanitary composition according to claim 1, characterised in that the carvacrol is at a concentration between 22 and 310 ppm.

3. A phytosanitary composition according to claim 1, characterised in that the potassium carbonate is at a concentration between 10 and 25 mM.

4. A phytosanitary composition according to claim 1, characterised in that the composition is in liquid or solid form which remains stable over time or is incorporated in a support.

5. A phytosanitary composition according to claim 1, characterised in that the phytosanitary composition is formulated together with additives.

6. A phytosanitary composition according to claim 1, which further comprises a fertiliser selected from the group consisting of compounds containing nitrogen and/or phosphorus and a mixture thereof.

7. A phytosanitary composition according to claim 1, which further comprises a compound or product having chemical and/or biological activity used in agriculture.

* * * * *